United States Patent Office 3,001,996
Patented Sept. 26, 1961

3,001,996
SULFATES AND SULFONATES OF N-TERTIARY AMINO ALKYL-CARBOXYLIC ACID AMIDES
Hans S. Mannheimer, 905 West End Ave., New York, N.Y., assignor to himself and John J. McCabe, Jr., jointly
No Drawing. Filed Feb. 8, 1957, Ser. No. 638,904
6 Claims. (Cl. 260—247.1)

This invention relates to novel compositions and to methods for producing them. In one of its more specific aspects, the invention is directed to the method of making and to novel derivates of metal salts of certain amino acids, to which I shall hereinafter refer to as "amino acid metal salts."

Salt "amino acid metal salts" are useful as detergent, foaming, wetting, emulgating, emulsifying and dispersing agents. They are surface active agents, and serve as excellent synthetic detergents, dye assistants and softeners in the textile and related fields.

Said "amino acid metal salts," employed as starting materials in the practice of this invention are amphoteric surface active agents and have the following general Formula I:

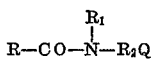

$$R-CO-N(R_1)-R_2Q$$

in which R is an organic radical, which, if connected to a carboxyl group, provides a monocarboxylic acid, and said radical contains at least 4 carbon atoms and for most purposes is a hydrocarbon radical of 4–18 carbon atoms; $R_1$ is hydrogen or an aliphatic hydrocarbon radical having 1–4 carbon atoms, such as —$CH_3$—$C_2H_5$, —$C_3H_7$, and —$C_4H_9$ or any one of said radicals having one or more of the hydrogens thereof which has been hydroxy substituted, illustrative examples of which are —$C_2H_4OH$, —$CH_2CHOHCH_3$, —$CHOHCHOHCH_2OH$ or any one of said radicals, but of 2–4 carbon atoms and whose hydrogens have been either unsubstituted or hydroxy substituted and having a single ether (—O—) or keto (—CO—) linkage therein, illustrative examples of which are —$C_2H_4$—O—$CH_3$, —$C_2H_4$—O—$C_2H_4OH$,
—$CH_2CHOH$—O—$C_2H_5$, —$CH_2$—CO—$CH_3$,
—$C_2H_4$—CO—$C_2H_4OH$, —$CH_2OH$—CO—$C_2H_5$;

$R_2$ is a hydrocarbon group having 1–8 carbon atoms, such as —$CH_2$—, —$C_2H_4$—, $C_2H_6$— and —$C_4H_8$—, or any one of the aforesaid groups, any one or more of whose hydrogens has been hydroxy substituted, illustrative examples of which are

—$CH_2CHOHCH_2$—, —$CH_2CHOHCHOHCH_2$—, and preferably such hydrocarbon groups of 3 and 8 carbon atoms, wherein one or more of the hydrogen atoms thereof not attached directly to the terminal carbon atoms of said groups have been hydroxy substituted, or any one of said groups, but of 2–8 carbon atoms and whose hydrogens have been either unsubstituted or hydroxy substituted and having a single ether (—O—) or keto (—CO—) linkage therein; Q is selected from the group consisting of:

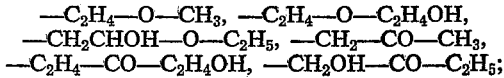

and

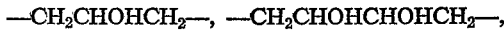

Y and $Y_1$ are each selected from the class consisting of $R_6$ and $R_2$—COOM; $R_6$ is selected from the class consisting of radicals selected from the group consisting of aliphatic, aromatic and aromatic-aliphatic hydrocarbon radicals of 1–12 carbon atoms, such as, —$CH_3$,—$C_2H_5$, —$C_3H_7$,—$C_4H_9$,
—$C_5H_{11}$,—$C_6H_{11}$, —$C_6H_5$, —$C_6H_4$—$CH_3$, etc., hydroxy substituted aliphatic hydrocarbon radicals of 2–12 carbon atoms, illustrative examples of which are

—$CH_2CHOHCHOHCH_3$, —$CH_2CHOHCH_3$, aliphatic ether radicals each of said radicals having at least one ether (—O—) linkage therein and otherwise being either hydrocarbon or hydroxy substituted hydrocarbon of 2–12 carbon atoms, illustrative example of which is —$CH_2CHOHCH_2OCH_3$; M is an alkali metal preferably sodium or potassium; and A is either a halogen or hydroxyl; and T is selected from the class consisting of (e) hydrocarbon portion of a piperidine or pyrolle ring; (f) the hydrocarbon portion of either of said rings having at least 1 and up to 5 alkyl substituents, with the alkyl substituents being of 1–5 carbon atoms, and (g) oxyhydrocarbon portion of a morpholine ring.

Said "amino acid metal salts" may be produced in a number of different ways:

One of the methods which may be employed is to first react a diamine with an organic acid in the molecular proportion of 1 to 1. When approximately 1 mole proportion of water of reaction has been formed and the acid number of the mass is zero, the reaction is terminated, and the resulting reaction mass is reacted with various compounds to provide an "amino acid metal salt" defined in Formula I.

The organic acid reacted with a diamine is one containing a single COOH group or any of the available anhydrides of said acids and by the term monocarboxylic organic acid as used herein, I mean to include both the acid and the anhydride thereof which I regard as the equivalent of the acid. These acids may be: the aliphatic open chain saturated or unsaturated fatty acids as well as said fatty acids containing hydroxy or keto groups and/or other substituents, such as aryl radicals, as for example, acids of the type of Twitchell fatty acids, cycloaliphatic carboxylic acids preferably containing no more than 4 condensed nuclei and examples of which are hexahydrobenzoic, resinic, and naphthenic acids; heterocyclic aliphatic carboxylic acids, such as the various pyridine carboxylic acids.

While carboxylic acids having any number of carbon atoms may be employed, I prefer to employ those having at least 5 carbon atoms and preferably 5–19 carbon atoms in straight chain relationship. The acids which I employ may be derived from a number of different sources. Among some of them are the acid components chosen from oil or fats, of animal, marine or vegetable origin and these include; the acids of cocoanut, palm kernel and palm oil, also from soy beans, linseed, olive, rapeseed, cottonseed, peanut and castor oil which contain large proportions of unsaturated hydroxy fatty acids and also the acids derived from tallow, fish and seal oils, whale or shark oils and the hydrogenated acids from these sources. Moreover, the synthetic high molecular weight fatty acids, obtained by the oxidation of paraffin wax and similar high molecular weight hydrocarbons by means of gaseous oxidizing agents may be employed. In addition the acid may be one of the resinic acids, such as abietic acid, or the naphthenic acids and long chain fatty acids having an aromatic hydrocarbon radical connected directly with the aliphatic chain (Twitchell fatty acids) as are obtainable from oleic, ricinoleic, linoleic and similar unsaturated fatty acids. Instead of employing mixture of acids from oil, fats and resins, single acids may be used, for example, caproic, myristic, heptylic, caprylic, undecylic, lauric, palmitic, stearic, behenic, arachic, cerotic, oleic, erucic, linoleic, linolenic, ricinoleic and hydroxystearic acids.

Examples of some diamines which may be employed in the production of starting materials are aminoethyl-ethanolamine ($NH_2$—$C_2H_4$—$NH$—$C_2H_4OH$), m e t h y l amino isopropyl isopropanol amine

($CH_3NHC_3H_6NHC_3H_6OH$)

amino isobutyl isobutanol amine ($NH_2C_4H_8NHC_4H_8OH$), amino hydroxy propyl propane diol amine,

($NH_2C_3H_5OHNHC_3H_4(OH)_2$)

propyl amino ethoxy ethyl ethoxy ethanol amine

$C_3H_7NHC_2H_4OC_2H_4NHC_2H_4OC_2H_4OH$)

butyl amino hydroxy propyl acetol amine,

($C_4H_9NHC_3H_5OHNHCH_2COCH_2OH$)

ethyl amino propanone ethanol amine

($C_2H_5NHCH_2COCH_2NHC_2H_4OH$)

amino ethyl methyl amine ($NH_2$—$C_2H_4NHCH_3$), ethanolamino ethanol methyl amine

($C_2H_4OH$—$NH$—$C_2H_3OH$—$NH$—$CH_3$)

amino ethyl diethyl ether amine

($NH_2$—$C_2H_4$—$NH$—$C_2H_4$—$O$—$C_2H_5$)

amino ethyl morpholine

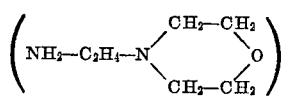

amino ethyl piperidine

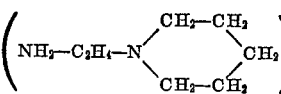

amino ethyl pyrolle

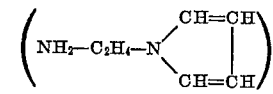

ethylene diamine ($NH_2$—$C_2H_4$—$NH_2$), phenylene diamine ($NH_2$—$C_6H_4$—$NH_2$), respectively, hereinafter referred to as reactants A, B, C, D, E, F, G, H, I, J, K, L, M, N, and O.

The reactants A–G and N and O respectively may be produced by employing a number of different classical methods well known to the art. One method consists essentially in reacting ammonia with a compound which is the dichloride of the $R_2$ group between the two nitrogens and has formula Cl—$R_2$—Cl, and subsequently treating the diamine produced with caustic soda to remove HCl which is attached. Then the resultant diamine is reacted with a compound of the formula Cl—$R_2$—OH, and if $R_1$ is other than hydrogen, another reactant $R_1$—Cl is used. Again, the hydrochloride is removed.

One of the well-known commercial methods employed in the production of some of said diamines is predicated upon the reaction of epoxy compounds, such as, ethylene oxide, propylene oxide, etc., with ammonia to form the intermediate diamine which is subsequently reacted with additional epoxy compound in the presence of water.

The reactants K, L, and M may be prepared by employing the classical method of reacting morpholine, piperidine and pyrolle respectively with ethylene oxide and ammonia.

Among some of the salts of the halo acids which may be employed are the sodium and potassium salts of monochloracetic acid, monochlorpropionic acid, monochlorlac- tic acid, monochlorhydroxyacetic acid obtainable from di-chloracetic acid, monochloracetoacetic acid, monochlorethoxyacetic acid, etc.

One of the general types of method which may be employed for the production of some of these starting materials consists in first reacting one mol of a monocarboxylic acid having at least 4 carbon atoms in its radical connected to its COOH group with one mol of one of said diamines, examples of which are reactants A–J, until only approximately 1 mol of water has been removed. In carrying out this reaction the mixture is first heated to about 110–180° C. in vacuum of 90–130 mm. of mercury pressure until one mol of water of reaction has been produced and removed. (All of the terms "mm." and "mm. pressure" as used in this entire description are intended to mean mm. of mercury pressure.) The reaction mass is then allowed to cool to room temperature and consists essentially of a reaction product known hereinafter as Product X and of the following general formula:

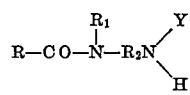

This reaction product in turn is reacted with a monohalocarboxylic acid in the presence of 2 moles of caustic soda in aqueous solution. In one of its preferred forms one mole of said reaction mass is added to an aqueous solution containing one mole of the monohalocarboxylic acid and 2 moles of caustic soda, which solution prior to the addition has been prepared and maintained at a temperature no greater than 20° C. The mix is heated to a temperature of 95° C. until the pH has been reduced from about 13 to 8–8.5 and there is no further change in pH upon continued heating at said temperature. The resultant reaction product is of the following general formula:

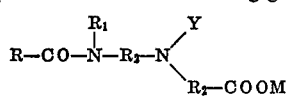

This compound in turn may be reacted by heating 1 molecular proportion thereof with 1 molecular proportion of an alkali metal salt of a monohalomonocarboxylic acid in the temperature range of 80–100° C. to provide a starting material of the following general formula:

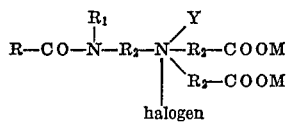

And this compound in turn may be treated with caustic soda to replace the halogen with an hydroxyl group.

If desired, compounds of the formula of product X may be reacted with a compound of the formula of $R_6$—Cl for example and then treated with caustic soda to remove the HCl formed to provide a compound of the formula:

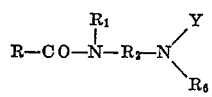

and 1 molecular proportion of this compound in turn may be reacted with a 1 mole proportion of an alkali metal salt of a monohalomonocarboxylic acid to provide a compound of the formula:

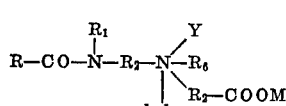

and this compound in turn may be treated with caustic soda to replace the halogen with an hydroxyl group.

Still other starting materials may be produced by reacting 1 mole proportion of reactants N and O respectively with 1 mole proportion of one of said monocarboxylic acids to provide compounds of the formula:

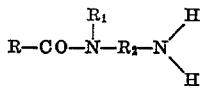

and 1 mole proportion of such compound is reacted with 1 mole of $R_6$—Cl and subsequently treated with caustic soda to provide compound of the formula:

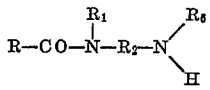

which in turn is reacted in equimolecular proportion with $R_6$—Cl and subsequently treated with caustic soda to provide compound of the following formula:

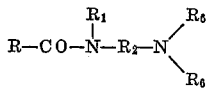

which in turn is reacted in equimolecular proportion with an alkali metal salt of a monohalomonocarboxylic acid to provide compound of the following formula:

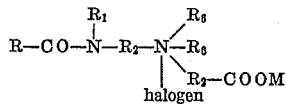

which in turn is treated with caustic soda to replace the halogen with an hydroxyl group.

Still other starting materials may be prepared by reacting 1 mole proportion of reactants K, L, and M with 1 mole proportion of one of said monocarboxylic acids to provide a compound of the formula:

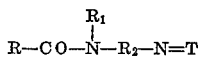

in which T is the hydrocarbon portion of either an unsubstituted or alkyl substituted piperidine or an unsubstituted, hydrogenated or alkyl substituted pyrolle ring or the oxyhydrocarbon portion of the morpholine ring. Such compounds are reacted with an alkali metal salt of a monohalomonocarboxylic acid to provide a compound of the formula:

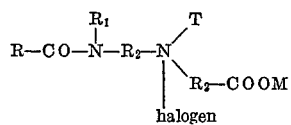

and this compound in turn may be treated with caustic soda to replace the halogen with an hydroxy group.

1 mole proportion of still another reactant, namely amino pyridine

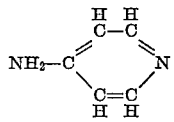

may be reacted with 1 mole of one of said monocarboxylic acids and subsequently 1 mole of the reaction product is reacted with 1 mole of an alkali metal salt of a monohalomonocarboxylic acid and then treated with NaOH to provide:

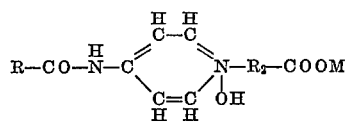

If desired said compound of the formula:

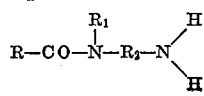

may be reacted with 2 moles of a monohalomonocarboxylic acid in the presence of 4 moles of caustic soda to provide compounds of the formula:

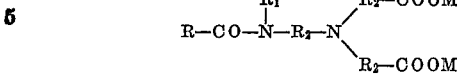

which in turn may be reacted with 1 mole of an alkali metal salt of a monohalomonocarboxylic acid to provide compounds of the formula:

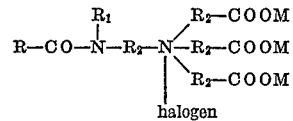

which may be treated with caustic soda to replace the halogen with hydroxyl.

Of course, it is to be understood that the compounds of Formula I as before set forth is meant to include throughout the present description and claims, such compounds as well as their inner salts or anhydrides, which may be represented as follows:

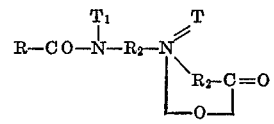

and

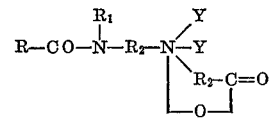

and which may be at least in part produced in the production of such compounds of Formula I as heretofore given. Of course, it is also understood that KOH may be used in place of caustic soda in the preparation of the various starting materials used in the practice of this invention.

The following are illustrative examples, given merely for the purpose of illustration, of how some of the starting materials employed in the practice of this invention may be produced, all parts being given by weight unless otherwise specified.

GENERAL EXAMPLE—A 1 mole of one of said monocarboxylic acids and parts of a diamine such as $NH_2$—$R_2$—$NH_2$ are charged into a reaction vessel and while being constantly stirred, heated, and maintained in the temperature range of 140°–170° C. until about 1 mole of water of reaction has been removed to provide reaction product A of the formula:

R—CO—NH—$R_2$—$NH_2$

Then 1 mole of reaction product A is introduced into a previously prepared mass at a temperature of 15–20° F. and consisting of 2 moles of caustic soda dissolved in 17 moles of water to which was added 2 moles of methyl chloride while being maintained at about 15–20° F. After the addition of reaction product A to said mass, and while being constantly stirred, the mix is slowly heated to about 80° C. while the pressure in the reaction vessel is allowed to build up to and maintained at approximately 5–10 pounds per sq. in. The reaction is terminated when the pH of the mass, which at the start of the reaction was approximately 13 has become reduced to about 8–8.5 and no substantial pH change occurs after 10 more minutes.

If reactants employed have boiling points greater than that of water instead of temperature of 80° C. temperatures of 95–100° C. are recommended and superatmospheric pressure may not be required.

In any case the reaction mass at a pH of about 8–8.5 is then cooled to 30–40° C. and 1 mole of caustic soda and 1 mole of the monohalomonocarboxylic acid is added thereto. This mixture while being constantly stirred is heated to about 100° C. and maintained at that temperature for about 2–3 hours until a sample thereof in water provides a clear solution to indicate that the reaction is completed. Then there is added thereto an additional mole of caustic soda to provide a starting material A of the formula:

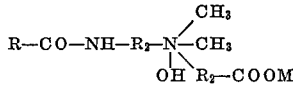

Of course, it is to be understood that instead of the 2 moles of methyl chloride, 2 moles of ethyl chloride may be used to provide starting material the same as that above set forth except that —$C_2H_5$ is substituted for each —$CH_3$ thereof; or 1 mole of propyl chloride and 1 mole of benzyl chloride are together substituted for the 2 moles of methyl chloride, to provide starting material same as above except that —$C_3H_7$ and —$CH_2$—$C_6H_5$ are substituted for the —$CH_3$ radicals. Obviously, other reactants may be used to provide other groups within the definition of Y using reactants and methods known to those skilled in the art.

It is also to be understood that instead of employing a diamine in which $R_1$ is H as that $R_1$ may be any of the organic radicals heretofore defined.

EXAMPLE B—U

Following the procedure of General Example—A and employing lauric acid ($C_{11}H_{23}$—COOH) as the monocarboxylic acid, ethylene diamine (reactant N) as the diamine, and monochloracetic acid as the monohalomonocarboxylic acid, starting material B produced and is of the following formula:

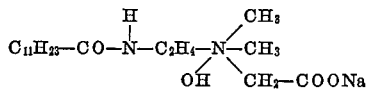

In the foregoing procedure substitute 1 mole of capric acid for the 1 mole of lauric acid, 1 mole of phenylene diamine for the 1 mole of ethylene diamine, 1 mole of benzyl chloride and 1 mole of propyl chloride for the 2 moles of methyl chloride and 1 mole of monochlorlactic acid for the 1 mole of chloracetic acid to produce starting material C, which is of the following formula:

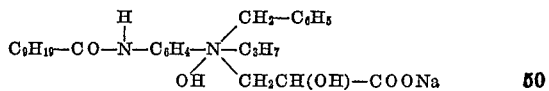

In the foregoing procedure substitute for the 1 mole of the lauric acid, 1 mole of dodecylbenzene monocarboxylic acid ($C_{12}H_{25}$—$C_6H_4$—COOH), 1 mole of linseed fatty acid ($C_{17}H_{31}$—COOH), 1 mole of caproic acid ($C_5H_{11}$—COOH), 1 mole of stearic acid ($C_{17}H_{35}$—COOH), and 1 mole of myristic acid ($C_{13}H_{27}$—COOH), respectively to provide respective compounds which are of the same formula as that of starting material B, except that the radicals $C_6H_5$—$CH_2$—, $C_{17}H_{31}$—, $C_5H_{11}$—, $C_{17}H_{35}$—, and $C_{13}H_{27}$— are respectively substituted for the radical $C_{11}H_{23}$— therein and are known as starting materials D—H respectively.

Employ same procedure as that set forth except that instead of the 1 mole of ethylene diamine (reactant N) use 1 mole of respective reactants H, I, and J and instead of the 2 moles of methyl chloride use 1 mole of phenyl chloride ($C_6H_5$—Cl) and instead of the 1 mole of chloracetic acid use 1 mole of chlorpropionic acid to obtain the following respective materials:

*Starting material I*

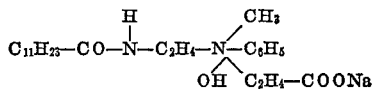

*Starting material J*

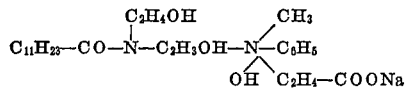

*Starting material K*

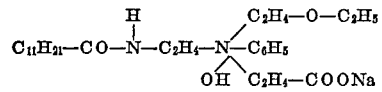

Employ the same procedure as that set forth except that instead of 1 mole of lauric acid, 1 mole of $C_6H_{13}$—$C_6H_4$—COOH is used, 1 mole of reactant A is used instead of reactant N, 1 mole of ethyl chloride is used instead of the 2 moles of methyl chloride to obtain starting material L of the following formula:

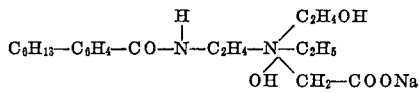

Employ the same procedure as that set forth except that instead of 1 mole of reactant N, 1 mole of reactants B, C, E–F respectively are used, and instead of 2 moles only 1 mole of methyl chloride is used, to provide starting materials M–Q respectively of the following formulas:

*Starting material M*

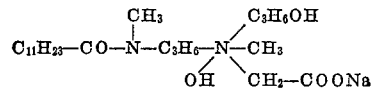

*Starting material N*

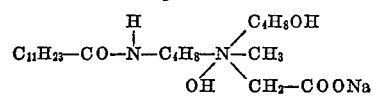

*Starting material O*

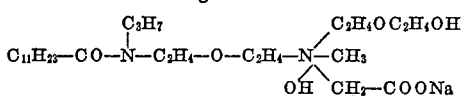

*Starting material P*

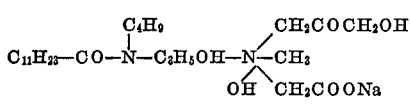

*Starting material Q*

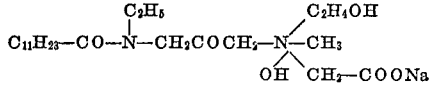

Employ the same procedure as that heretofore set forth except that instead of 1 mole of reactant N, 1 mole of the reactants K, L, and M respectively are used and the step of methylation is completely omitted, to provide starting materials R, S, and T respectively of the following formulas:

*Starting material R*

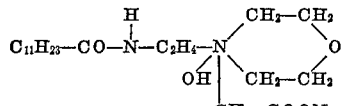

*Starting material S*

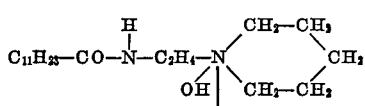

Starting material T

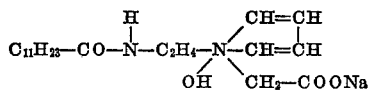

Other examples of starting materials which may be used in the practice of this invention are those the same as S, except the respective ring structure may be alkylated, as well as those the same as T, except that the ring structure may be partially or completely hydrogenated or alkylated.

1 mole of product

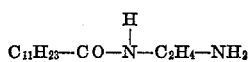

an example of product A of General Example—A, mixed with a previously prepared aqueous mass which was prepared and maintained at about 10° C. and consisted of about 25 moles of water to which were added 2 moles of chloracetic acid and 4 moles of caustic soda. After the addition of such product to said aqueous mass at 10° C., the mix was constantly stirred and while being constantly stirred was heated to about ° C. until the pH thereof has been reduced from about 12–13 to about 8–8.5. Then the mass is allowed to cool to 30–40° C. and there is added thereto 1 mole of chloracetic acid and 1 mole of caustic soda and the resultant mass while being constantly stirred is heated to and maintained at about 100° C. for about 2–3 hours until a sample thereof in water provides a clear solution. Then a mole of caustic soda is added thereto to provide the following compound, which is starting material U.

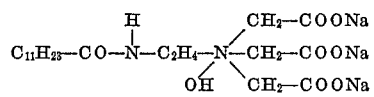

Other illustrative compounds which may be prepared in the manner known to the art and which I employ as starting materials in the practice of this invention are:

Starting material V

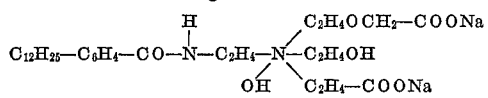

Starting material W

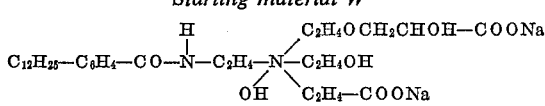

These starting materials V and W may be prepared by reacting 1 mole of dodecyl benzoic acid with 1 mole of reactant N in the manner previously described. To this is introduced a previously prepared solution of 1 mole of caustic soda and 1 mole of ethylene chlorhydrin in 17 moles of water which was prepared and maintained at 10–15° C. The mixture is then heated under reflux condenser to and maintained at 100° C. until the resulting pH of 8–8.5 does not change after 10 more minutes. The mass is then cooled to 30–40° C. whereupon 2 moles of caustic soda in a 50% aqueous solution and 1 mole of monochloracetic acid or 1 mole of monochlorlactic acid in saturated aqueous solution are introduced and the mix again heated to and maintained at 100° C. for 2–3 hrs. until the pH is reduced to 8–8.5. The mass is again cooled to 30–40° C. and 1 mole of monochlorpropionic acid in saturated aqueous solution and 1 mole of caustic soda in 50% aqueous solution are added thereto and the mass is still again heated to 100° C. for 2–3 hours until a clearly water soluble product is obtained. Then another mole of caustic soda is added to provide starting material V or W.

Still another group of starting materials which may be employed in the practice of this invention are exemplified by the starting material AA produced by reacting lauric acid with amino pyridine and subsequently reacting 1 mole of the resultant reaction product with a previously prepared solution consisting of 2 moles of caustic soda and 1 mole of chloracetic acid to provide such compound AA of the following general formula:

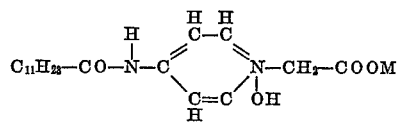

Instead of using said amino pyridine as a reactant, such compound which has first been partially or completely hydrogenated and/or alkylated may be used to provide other starting materials which may be substituted for AA herein.

Prior to this invention, it was known that cationic surface active agents and anionic surface active agents when together in aqueous solution resulted in the production or formation of water insoluble compounds, and that adding an anionic surface active agent to an aqueous solution of another anionic surface active agent resulted in a mere physical combination of said agents and that no reaction would occur between them.

Said compounds of Formula I normally behave anionically in aqueous solutions having a pH above 7, and consequently it was expected that when in aqueous solution together with anionic surface agents that they would be combined physically only and that no chemical reaction would occur therebetween. In the course of my experimentations, I have discovered that they could be reacted with certain anionic surface active agents at a pH above 7 to produce water-soluble reaction products. Not only did I make said discovery, but I further discovered that water solutions of such reaction products had viscosities greater than corresponding aqueous solutions of compounds of Formula I, and also exhibited better foaming characteristics than did said compounds in very low dilutions under extreme water hardness conditions. Said reaction products are non-toxic and non-irritating to the human skin. They have been found eminently useful as general utility detergents, such as for car washing, dish washing, clothes washing, etc. Said compounds of Formula I and compounds of Formula II when, any one of them alone or a combination of two or more of them in mere physical mixture are used as components of shampoos caused varying degrees of irritation and marked stinging of the eyes when such shampoos were used and water solutions thereof accidentally reached the eyes. I have further discovered that the reaction products of this invention caused practically no irritation or stinging of the eyes when so employed.

According to this invention, one or a combination of two or more of said amphoteric surface active agents which are compounds of the general structural Formula I are reacted with one or a combination of two or more anionic surface active agents which are sulfonic or sulfate salts of detergent compounds, examples of which are compounds of the following general structural Formula II to provide novel, water-soluble compounds having the following general structural Formula III having high wetting, detergency and surface active properties and capable of providing voluminous and stable foams in aqueous solutions, and which solutions are substantially non-irritating to the skin and eyes of normal human beings.

FORMULA III

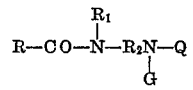

Said compounds of Formula III as heretofore set forth not only may be employed as components in shampoos of either liquid, semi-solid, or solid nature and find utility as good detergents, they find especial and particular utility in the field of shampoos and other detergent compositions where germicidal, germistatic, bactericidal, bactericestatic, biocidal and biocidal characteristics are of importance and value for the reason that said compounds of Formula III do have such characteristics.

Said examples of compounds of Formula II respectively may be represented as follows:

$$G—M$$

wherein M has heretofore been defined and G is selected from the group consisting of:

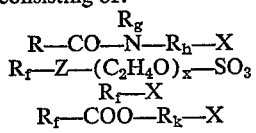

wherein $R_f$ is selected from the class consisting of aliphatic hydrocarbon radicals of 6–20 carbon atoms and aliphatic-aromatic hydrocarbon radicals with a maximum of 20 carbon atoms and having at least 6 carbon atoms in the aliphatic portions thereof; $R_g$ is selected from the class consisting of (a–1) hydrogen, (a–2) aliphatic hydrocarbon radicals of 1–8 carbon atoms, (a–3) hydroxy substituted aliphatic hydrocarbon radicals of 1–8 carbon atoms, (a–4) aliphatic ether radicals, each having at least one ether oxygen linkage therein and otherwise being hydrocarbon of 2–8 carbon atoms, (a–5) aliphatic ether radicals, each of said radicals having at least one ether oxygen linkage therein and otherwise being hydroxy substituted hydrocarbon of 2–8 carbon atoms; $R_h$ is selected from the group consisting of (b–1) unsubstituted and hydroxy substituted aliphatic, aromatic and aromatic-aliphatic hydrocarbon groups of 1–12 carbon atoms, (b–2) aliphatic keto groups, each of said groups having at least one keto carbonyl linkage therein and otherwise selected from the class consisting of hydrocarbon and hydroxy substituted hydrocarbon of 2–12 carbon atoms, (b–3) aliphatic ether groups, each of said groups having at least one ether oxygen linkage therein and otherwise being hydrocarbon of 2–12 carbon atoms, (b–4) aliphatic ether groups, each of said groups having at least one ether oxygen linkage therein and otherwise being hydroxy substituted hydrocarbon of 2–12 carbon atoms, (b–5) aliphatic groups having a CONH linkage therein and otherwise being hydrocarbon of 2–12 carbon atoms; $R_k$ is selected from the group consisting of unsubstituted and hydroxy substituted aliphatic hydrocarbon groups of 1–12 carbon atoms, said (b–2) to said (b–5); X is selected from the group consisting of $SO_3$ and $OSO_3$; and M is an alkali metal.

According to this invention, I react a compound of Formula I with a compound of Formula II to provide the novel and highly useful compounds of Formula III. In general, this reaction is carried out in a solution containing compounds I and II and to which a quantity of an acidic agent such as a strong mineral acid, as for example hydrochloric, sulphuric or its equivalent, has been added to lower the pH of the solution to a value of approximately 7 to approximately 9 and while maintaining the mass at a temperature between approximately 100–200° F. In this reaction under the aforesaid conditions, the compounds of Formula III are produced, said compounds having high water solubility. Such compounds of Formula III have an unexpected extremely high water-solubility, while the corresponding salts of cationic compounds are water-insoluble. The resultant aqueous solution can be used directly as a surface active agent, wetting agent or detergent for the purposes indicated for the compounds of Formula I. While the quantities of the compound of Formula I and compound of Formula II may be equimolecular for good yield of compounds of Formula III, I may employ an excess of either, and in general the mole ratio of a compound of Formula I to compound of Formula II may be 2 moles of the former to 1–3 moles of the latter.

One of the specific methods which I prefer to employ in carrying out an aspect of this invention is to first dissolve a compound of Formula I in water and then the pH thereof is adjusted to approximately 12–13 (measured electrically) by the addition of aqueous caustic soda if required so that when a compound of Formula II is added thereto, the pH of the solution of I and II will be at least 10 and generally 10.5–11. The temperature of said solution is raised to 100–200° F. and preferably in factory practice to approximately 140° F. Then a quantity of a compound of Formula II is dissolved in water in a separate container and this solution is added to said first solution and the mass is maintained in said temperature range while being constantly stirred, and an acidic agent is added thereto to reduce the pH thereof to a value below 10 and in the range of approximately 7 to 9, and preferably of approximately 8.2 to approximately 8.7. At the end of the acidic agent addition, the stirring is continued and the temperature of the mass maintained for about 10–20 minutes after which the solution is allowed to cool and is a finished product.

The following are specific examples merely given by way of illustrating the invention and are not to be taken by way of limitation, all parts being given by weight unless otherwise specified.

EXAMPLE 1

An aqueous solution of 368 parts of starting material B in 550 parts of water is heated to approximately 140° F. and its pH adjusted to 12–13 (measured electrically) by the addition of caustic soda. While being constantly stirred and maintained at that temperature there is added a solution of 400 parts of sodium salt of lauroyl monoethanolamide sulfate:

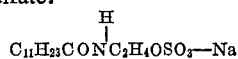

in 600 parts of water. Then while stirring and temperature is maintained, there is added thereto between about 30–40 parts of hydrochloric acid solution (32%) whereby the pH of the mass is lowered to a value in the range of 8.2 to 8.7. Stirring is continued and the temperature is maintained for about 10 minutes more. The resultant product is a solution of the novel reaction product of the following formula:

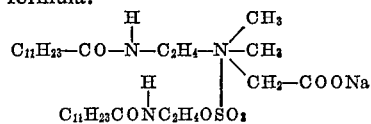

EXAMPLE 2

Employ the same procedure and components as set forth in Example 1, except that only 200 parts of the salt of the sulfate are employed. In this instance, the resultant product is a solution of the novel reaction product of Example 1 together with unreacted starting material B used in the approximate proportion of 2 to 1.

Employ the same procedure as that set forth in Example 1, but employ the components set forth in the following examples, the quantity of hydrochloric acid solution (32%) is variable to lower the pH to the values indicated to obtain the novel reaction products of the following examples.

EXAMPLE 3

503 parts of starting material C in 750 parts of water. 375 parts of lauroyl diethanolamide sulfate sodium salt:

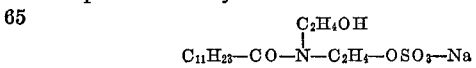

in 500 parts of water.

FORMULA OF NOVEL REACTION PRODUCT

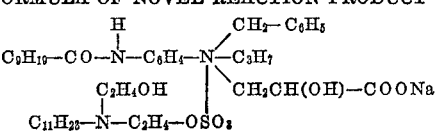

EXAMPLE 4

305 parts of starting material D in 460 parts of water. 400 parts of lauroyl triethoxyetheramide sulfate sodium salt:

$$C_{11}H_{23}-CO-\underset{H}{N}-(C_2H_4O)_3-SO_3-Na$$

in 600 parts of water.

FORMULA OF NOVEL REACTION PRODUCT

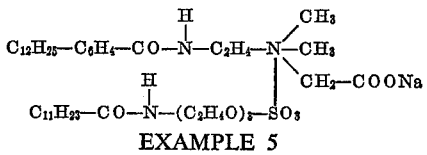

EXAMPLE 5

449 parts of starting material E in 680 parts of water. 400 parts of lauroyl monoethanolamide sulfonate sodium salt:

$$C_{11}H_{23}-CO-NH-C_2H_4-SO_3-Na$$

in 600 parts of water.

FORMULA OF NOVEL REACTION PRODUCT

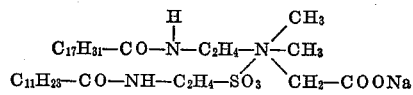

EXAMPLE 6

285 parts of starting material F in 430 parts of water. 400 parts of nonylphenyltriethoxyether sulfate sodium salt:

$$C_9H_{19}-C_6H_4-O-(C_2H_4O)_3-SO_3-Na$$

in 600 parts of water.

FORMULA OF NOVEL REACTION PRODUCT

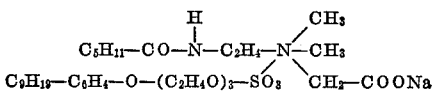

EXAMPLE 7

The same components as Example 6, except that the thioether of the salt is used to provide novel reaction product the same as that of Example 6, except that sulphur is substituted for the oxygen attached directly to the $C_6H_4$ group.

EXAMPLE 8

453 parts of starting material G in 680 parts of water. 400 parts of octylphenyltetraethoxy ether sulfate sodium salt:

$$C_8H_{17}-C_6H_4-O-(C_2H_4O)_4-SO_3-Na$$

in 600 parts of water.

FORMULA OF NOVEL REACTION PRODUCT

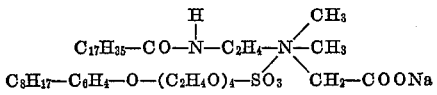

EXAMPLE 9

397 parts of starting material H in 600 parts of water. 300 parts of $$C_{12}H_{25}-OSO_3-Na$$

in 450 parts of water.

FORMULA OF NOVEL REACTION PRODUCT

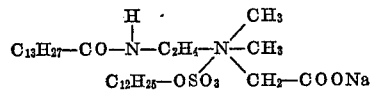

EXAMPLE 10

459 parts of starting material I in 690 parts of water. 300 parts of $$C_{12}H_{25}-SO_3-Na$$

in 450 parts of water.

FORMULA OF NOVEL REACTION PRODUCT

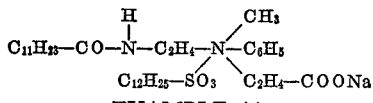

EXAMPLE 11

535 parts of starting material J in 800 parts of water. 320 parts of $$C_{11}H_{23}-C_6H_4-SO_3-Na$$

in 500 parts of water.

FORMULA OF NOVEL REACTION PRODUCT

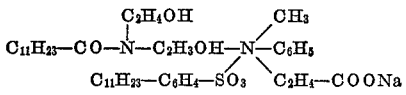

EXAMPLE 12

514 parts of starting material K in 770 parts of water. 380 parts of $$C_{11}H_{23}-COO-C_2H_4-NHCO-CH_2-SO_3-Na$$

in 570 parts of water.

FORMULA OF NOVEL REACTION PRODUCT

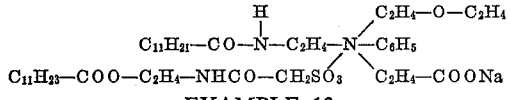

EXAMPLE 13

334 parts of starting material L in 500 parts of water. 310 parts of $$C_{11}H_{23}-COO-C_2H_4-SO_3-Na$$

in 450 parts of water.

FORMULA OF NOVEL REACTION PRODUCT

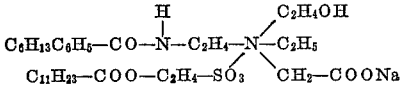

EXAMPLE 14

428 parts of starting material M in 640 parts of water. 370 parts of $$C_{11}H_{23}-COO-CH_2CHOHCH_2-OSO_3-Na$$

in 560 parts of water.

FORMULA OF NOVEL REACTION PRODUCT

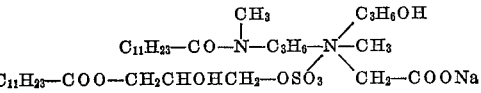

EXAMPLES 15—16

426 parts of starting material N and 528 parts of starting material O respectively in 640 parts of water. 400 parts respectively of lauroyl taurate sodium salt:

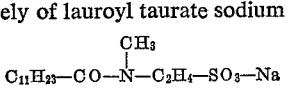

and of lauroyl sulfanilamide sodium salt:

$$C_{11}H_{23}-CO-NH-C_6H_4-SO_3-Na$$

FORMULAS OF RESPECTIVE NOVEL REACTION PRODUCTS

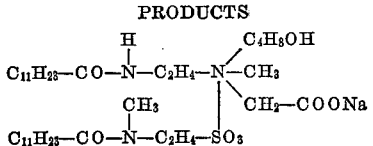

and

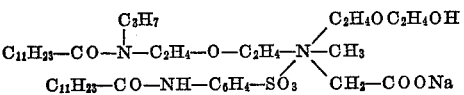

EXAMPLES 17—18

512 parts of starting material P and 454 parts of starting material Q respectively in 770 parts of water. 250 parts respectively of hexyl monoethoxyether sulfate sodium salt:

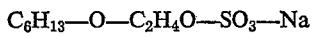

and of hexyl monoethoxy thioether sulfate sodium salt:

in 400 parts of water.

FORMULAS OF RESPECTIVE NOVEL REACTION PRODUCTS

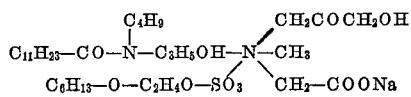

and

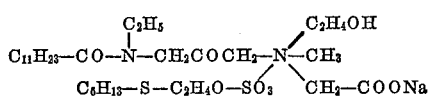

EXAMPLE 19

410 parts of starting material R in 620 parts of water. 230 parts of

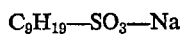

in 350 parts of water.

FORMULA OF NOVEL REACTION PRODUCT

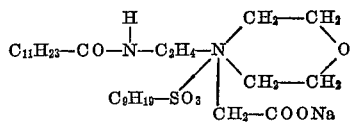

EXAMPLE 20

408 parts of starting material S in 610 parts of water. 350 parts of

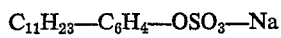

in 530 parts of water.

FORMULA OF NOVEL REACTION PRODUCT

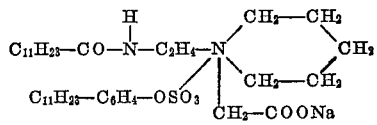

EXAMPLE 21

390 parts of starting material T in 590 parts of water. 240 parts of

in 360 parts of water.

FORMULA OF NOVEL REACTION PRODUCT

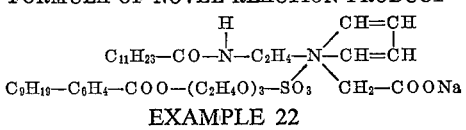

EXAMPLE 22

500 parts of starting material U in 750 parts of water. 400 parts of lauroyl amidoethylamidoacetyl sulfonate sodium salt:

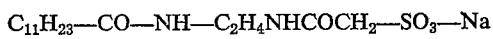

in 600 parts of water.

FORMULA OF NOVEL REACTION PRODUCT

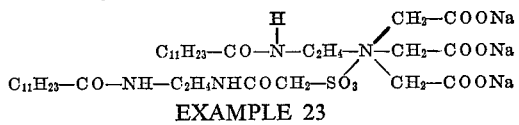

EXAMPLE 23

612 parts of starting material V in 920 parts of water. 300 parts of decyl monoethoxyether sulfate sodium salt:

in 450 parts of water.

FORMULA OF NOVEL REACTION PRODUCT

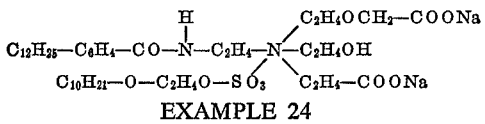

EXAMPLE 24

628 parts of starting material W in 940 parts of water. 290 parts of

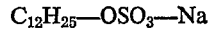

in 440 parts of water.

FORMULA OF NOVEL REACTION PRODUCT

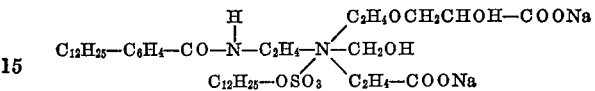

EXAMPLE 25

400 parts of starting material AA in 600 parts of water. 290 parts of

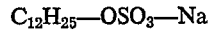

in 440 parts of water.

FORMULA OF NOVEL REACTION PRODUCT

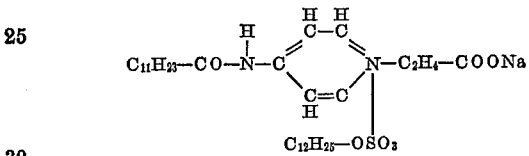

EXAMPLE 26

400 parts of material AA in 600 parts of water. 300 parts of

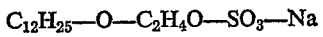

FORMULA OF NOVEL REACTION PRODUCT

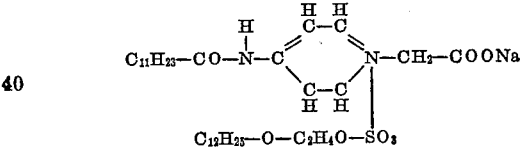

EXAMPLES 27—ON

Employing 1 mole proportion of all of the other specific compounds of Formula I respectively in about one and one-half times its weight of water and 1 mole proportion of any of the specific Formula II respectively in one and one-half times its weight of water, there are produced literally thousands of compounds of Formula III which differ from those of Examples 1–26 and such compounds are also specific examples of illustrative novel reaction products of this invention. In the same manner the specific compounds of Formula II are reacted with compounds the same as starting materials S and T and AA, except that the rings thereof have been alkylated, and in the case of AA may be hydrogenated and/or alkylated to provide still other novel reaction products.

It is also to be understood that any of the specific starting materials are shown herein merely as illustrative examples of the starting materials of Formula I which may be reacted with any of the specific sulfate or sulfonate salts which are shown herein merely as illustrative examples of some reactants of Formula II to produce novel compounds of Formula III.

It is to be understood that, as to compounds of Formula II where X is used and also as to novel reaction products thereof represented by such compounds of Formula III, when either $SO_3$ or $OSO_3$ is used in the specification or claims, it is meant to indicate either one or the other because of their obvious equivalency; it is also to be understood that the use of Na in the specification and claims is meant to indicate any of the other alkali metals because of their obvious equivalency; and it is also to be understood that the CONH linkage when part of compounds in the specification and claims is meant to indicate either it or NHCO because of their obvious equivalency.

It is also to be understood that instead of first adjusting the pH of the compound of Formula I to 12–13 before the addition of the compound of Formula II, any other method may be employed to obtain the condition whereby the pH of the solution of I and II is at least 10 and preferably 10.5–11 before the addition of the acidic agent to lower the pH of the mass to approximately 7 to approximately 9. For example, I and II may be dissolved together and this solution may by the addition of caustic soda when required have its pH adjusted to at least 10, and then at 100°–200° F. is ready for the addition of the acidic agent to lower its pH to approximately 7 to approximately 9.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described, and all statements of the scope of the invention which as a matter of language might be said to fall therebetween.

This application is a continuation-in-part of my copending applications Ser. No. 554,424, filed December 21, 1955, and issued as Patent 2,781,378, on February 12, 1957, Ser. No. 551,745, filed December 8, 1955 and issued as Patent 2,781,376 on February 12, 1957, Ser. No. 557,458, filed January 5, 1956, and issued as Patent 2,781,382 on February 12, 1957, and Ser. No. 562,940, filed February 2, 1956 and issued as Patent 2,781,371 on February 12, 1957.

I claim:

1. A compound of the following formula:

$$R-CO-N(R_1)-R_2Q-G$$

in which R is a hydrocarbon radical of 4–18 carbon atoms, $R_1$ is selected from the class consisting of (a) hydrogen, (b) alkyl hydrocarbon radicals and hydroxy alkyl hydrocarbon radicals of 1–4 carbon atoms, (c) alkyl ether groups of 2–4 carbon atoms, (d) hydroxyl alkyl ether groups of 2–4 carbon atoms, (e) alkyl keto groups of 2–4 carbon atoms, (f) hydroxy alkyl keto groups of 2–4 carbon atoms; $R_2$ is selected from the class consisting of (a) alkylene and hydroxy alkylene groups of 1–8 carbon atoms, (b) alkylene ether groups of 2–8 carbon atoms, (c) hydroxyalkylene ether groups of 2–8 carbon atoms, (d) alkylene keto groups of 2–8 carbon atoms and (e) hydroxyalkylene keto groups of 2–8 carbon atoms; Q is selected from the class consisting of:

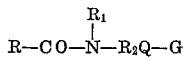

and

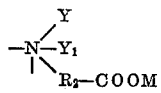

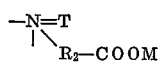

in which Y and $Y_1$ are each selected from the class consisting of $R_6$ and $R_2$—COOM; $R_6$ is selected from the class consisting of alkyl, aromatic and alkyl-aromatic hydrocarbon radicals of 1–12 carbon atoms, hydroxy alkyl radicals of 2–12 carbon atoms, alkyl ether radicals of 2–12 carbon atoms and hydroxy alkyl ether groups of 2–12 carbon atoms, T is selected from the class consisting of the hydrocarbon portions of piperidine ring, alkyl piperidine ring, pyrrole ring, alkyl pyrrole ring, and oxyhydrocarbon portion of morpholine ring; G is connected to the nitrogen of Q and is selected from the class consisting of sulfate and sulfonate radicals of detergent sulfate and sulfonic acid salts; and M is an alkali metal.

2. A compound of the following formula:

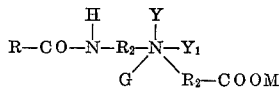

with Y and $Y_1$ being alkyl radicals of 1–12 carbon atoms, R being a hydrocarbon radical of 4–18 carbon atoms, each $R_2$ being an alkylene group of 1–4 carbon atoms, M being an alkali metal, and G being a sulfate radical of a detergent sulfate salt.

3. A compound of the following formula:

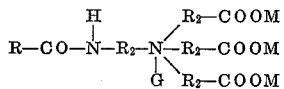

with R being hydrocarbon of 4–18 carbon atoms, each $R_2$ being an alkylene group of 1–4 carbon atoms, each M being an alkali metal, and G being a sulfate radical of a detergent sulfate salt.

4. A compound of the formula:

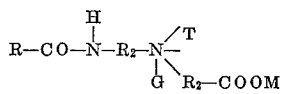

with R being a hydrocarbon radical of 4–18 carbon atoms, each $R_2$ being an alkylene group of 1–4 carbon atoms, T being hydrocarbon portion of piperidine ring, M being an alkali metal, and G being a sulfate radical of a detergent sulfate salt.

5. Compound of the formula:

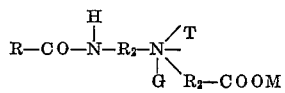

with R being a hydrocarbon radical of 4–18 carbon atoms, each $R_2$ being an alkylene group of 1–4 carbon atoms, T being hydrocarbon portion of pyrrole ring, M being an alkali metal, and G being a sulfate radical of a detergent sulfate salt.

6. A compound of the following formula:

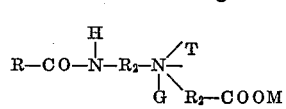

with R being a hydrocarbon radical of 4–18 carbon atoms, each $R_2$ being an alkylene group of 1–4 carbon atoms, T being oxyhydrocarbon portion of morpholine ring, M being an alkali metal, and G being a sulfate radical of a detergent sulfate salt.

References Cited in the file of this patent

UNITED STATES PATENTS

| | | |
|---|---|---|
| 2,103,872 | Schoeller et al. | Dec. 28, 1937 |
| 2,115,250 | Bruson | Apr. 26, 1938 |
| 2,130,668 | Gunther | Sept. 20, 1938 |
| 2,170,111 | Bruson | Aug. 22, 1939 |
| 2,214,352 | Schoeller et al. | Sept. 10, 1940 |
| 2,380,325 | Niederl et al. | July 10, 1945 |
| 2,459,088 | Moss et al. | Jan. 11, 1949 |
| 8,569,326 | Niederl et al. | Sept. 25, 1951 |
| 2,659,725 | Cusic | Nov. 17, 1953 |
| 2,695,291 | Niederl et al. | Nov. 23, 1954 |
| 2,781,370 | Manheimer | Feb. 12, 1957 |
| 2,781,371 | Manheimer | Feb. 12, 1957 |
| 2,781,373 | Manheimer | Feb. 12, 1957 |
| 2,781,376 | Manheimer | Feb. 12, 1957 |
| 2,781,378 | Manheimer | Feb. 12, 1957 |
| 2,781,380 | Manheimer | Feb. 12, 1957 |
| 2,781,382 | Manheimer | Feb. 12, 1957 |
| 2,781,383 | Manheimer | Feb. 12, 1957 |
| 2,781,384 | Manheimer | Feb. 12, 1957 |
| 2,794,024 | Ehrhart et al. | May 28, 1957 |